United States Patent
Rogala

[11] Patent Number: 6,155,644
[45] Date of Patent: Dec. 5, 2000

[54] SEAT RECLINER LOCKING MECHANISM

[75] Inventor: Richard Rogala, L'anse, Mich.

[73] Assignee: DaimlerChrysler Corporation, Auburn Hills, Mich.

[21] Appl. No.: 09/343,853

[22] Filed: Jun. 30, 1999

[51] Int. Cl.⁷ ..................................................... B60N 2/02
[52] U.S. Cl. ...................... 297/367; 297/375; 297/378.12
[58] Field of Search .................... 297/366, 367, 297/370, 362.12, 361.1, 374, 375, 378.1, 378.12, 378.14

[56] References Cited

U.S. PATENT DOCUMENTS

| | | | |
|---|---|---|---|
| 3,001,821 | 9/1961 | Marechal | 297/366 |
| 3,679,259 | 7/1972 | Simonelli | 297/379 |
| 3,788,698 | 1/1974 | Perkins | 297/373 |
| 4,243,264 | 1/1981 | Bell | 297/367 |
| 4,245,866 | 1/1981 | Bell et al. | 297/365 |
| 4,898,424 | 2/1990 | Bell | 297/367 |
| 5,421,640 | 6/1995 | Bauer et al. | 297/372 |
| 5,618,083 | 4/1997 | Martone | 297/375 |
| 5,718,482 | 2/1998 | Robinson | 297/367 |
| 5,984,412 | 11/1999 | Magyar | |

*Primary Examiner*—Milton Nelson, Jr.
*Attorney, Agent, or Firm*—William J. Coughlin

[57] ABSTRACT

An apparatus for allowing pivotal movement of a top portion of a seat relative to a bottom portion, is provided. The apparatus includes a mounting bracket, a fixed portion, and a rack portion. The mounting bracket is mounted to the bottom portion of the seat. The fixed portion has a plurality of fixed portion teeth extending from the fixed portion base and is mounted to the mounting bracket. The rack portion has a plurality of base portion teeth extending from the base portion towards the fixed portion. The end portion of the rack portion is pivotally connected to the top portion. An engaging member is pivotally connected to the mounting bracket. The engaging member moves the rack portion in a direction generally toward the rack portion and to lock the rack portion and the fixed portion in an engaged relationship in response to movement of a handle in one direction. A disengaging member is pivotally connected to the mounting bracket. The disengaging member moves the rack portion in a direction generally away from the engaging member to unlock the apparatus.

26 Claims, 6 Drawing Sheets

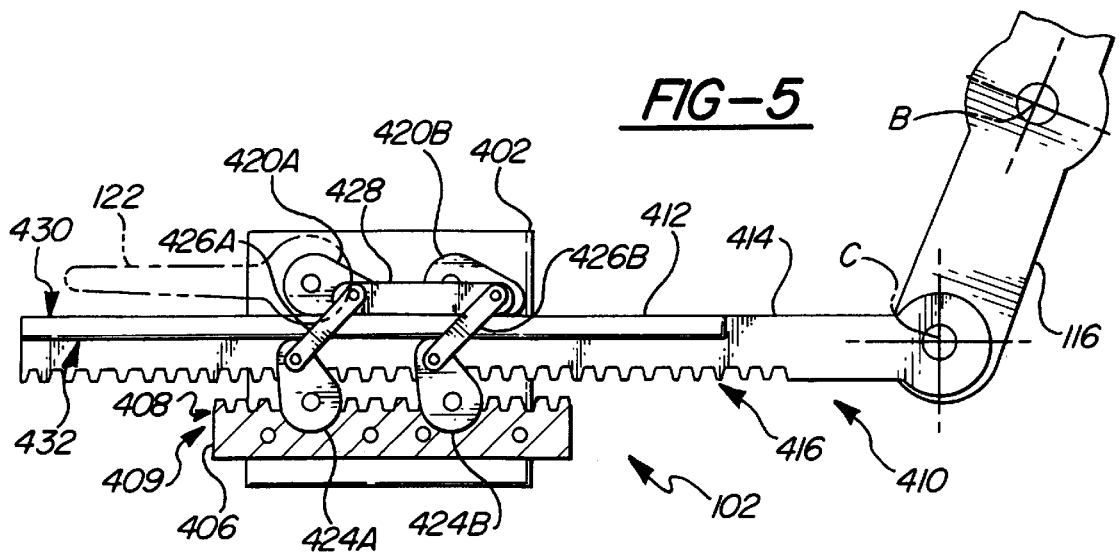
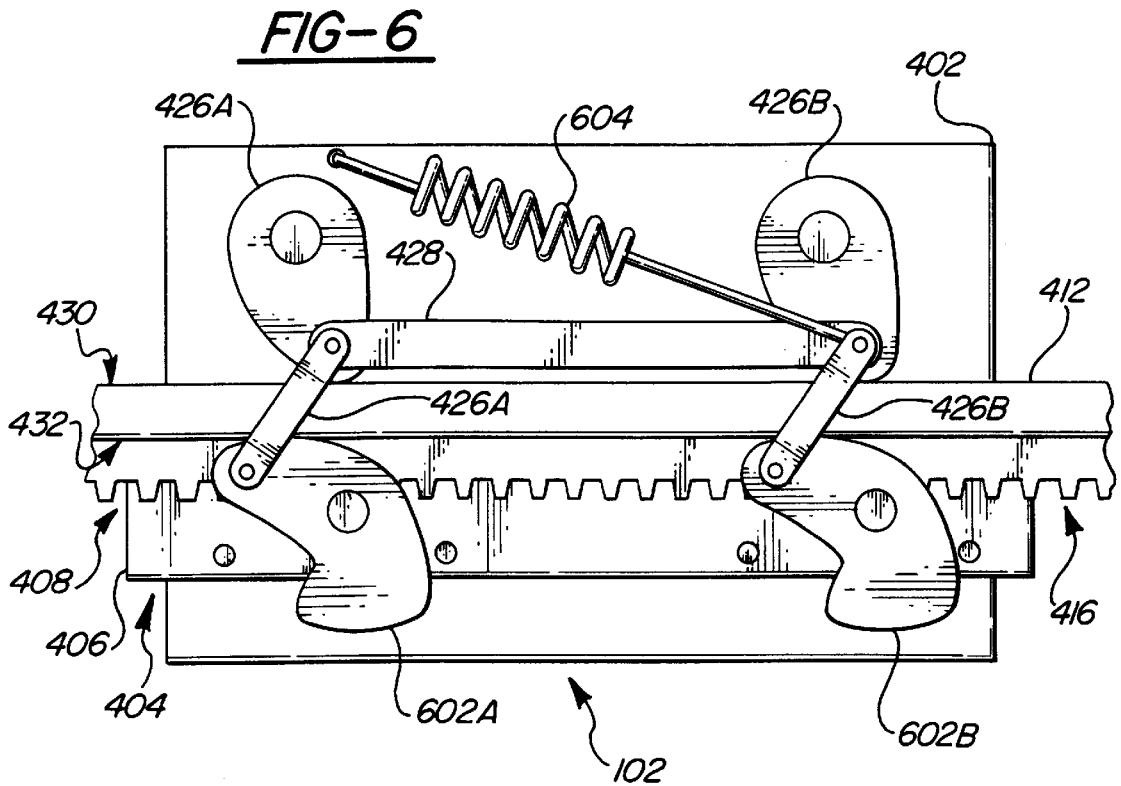

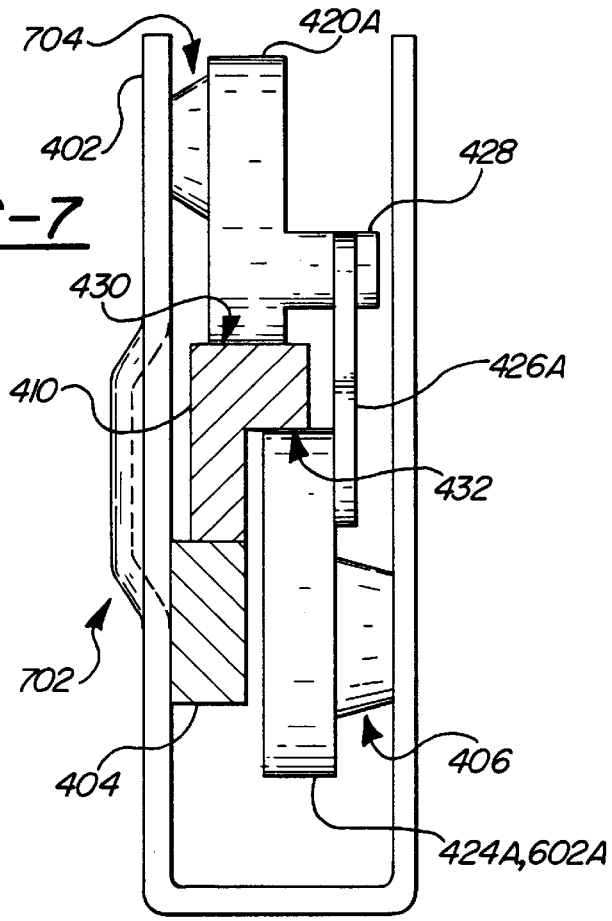
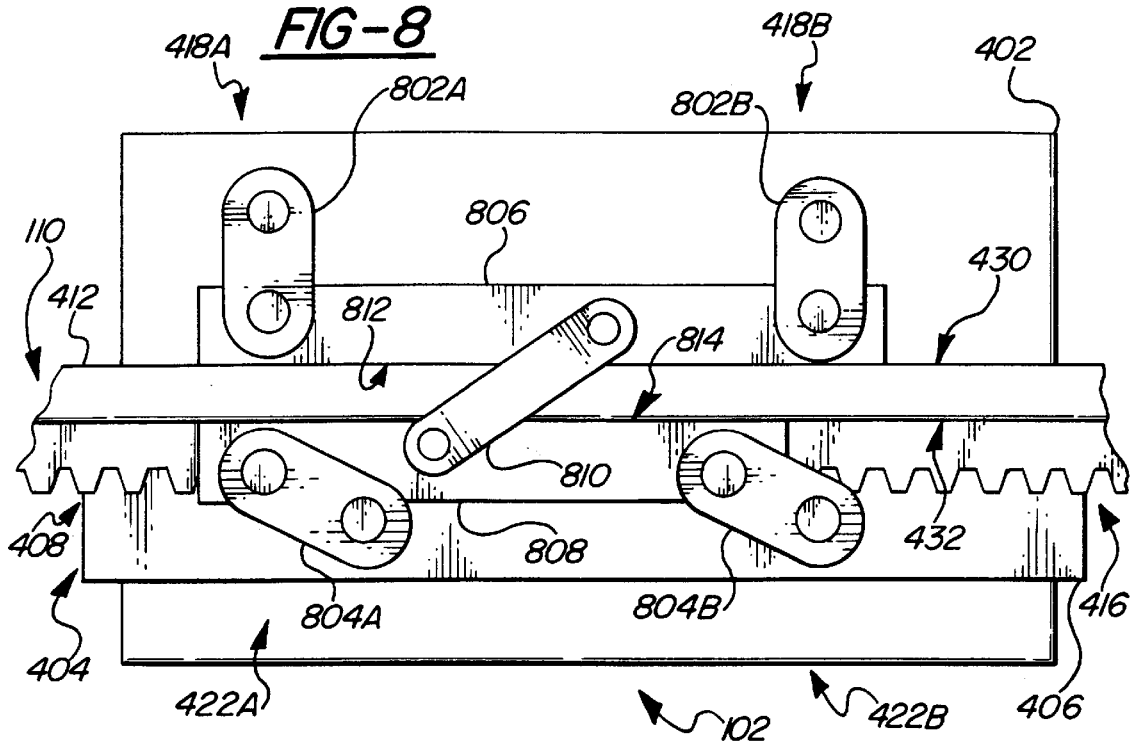

SEAT RECLINER LOCKING MECHANISM

FIELD OF THE INVENTION

This invention relates generally to reclining seats, and more particularly, to an apparatus for providing a locking mechanism for a reclining seat.

BACKGROUND OF THE INVENTION

Safety is one of the key issues addressed during the design of an automobile and its components. For example, in the design of today's automobile, flexibility is typically a goal in the design of a seat. The vehicle must be able to carry passengers and cargo equally well.

One manner in which to alternately maximize seating for people and space for cargo is to provide for removable seats. While this may accomplish the goal of maximizing seat and cargo space, it adds complexity.

Another method includes seats which are movable between reclining positions (for passenger comfort), an upright position, and a cargo bearing position. In the cargo bearing position, the seat top is rotated relative to the seat bottom to provide a generally flat cargo bearing surface.

However, the seat reclining mechanism has to provide enough rigidity to protect the passenger during vehicle accidents.

An example of an early method of providing a seat reclining mechanism is shown in U.S. Pat. No. 3,788,698 issued to Norman W. Perkins on May 8, 1972. In the Perkins device, a fixed member having a plurality of saw-tooth shaped serrations is mounted to the bottom of the seat. The fixed member is movable between two positions. The frame of the top portion includes a rounded member having a plurality of saw-tooth shaped serrations. In a first position the serrations on the fixed member engage the serrations on the frame, thereby preventing movement of the seat back relative to the bottom. In a second position, the fixed member is pulled back from the frame, thereby disengaging the serrations. The seat back may thus be adjusted. However, the Perkins arrangement does not provide the required seat rigidity because only a small portion of the radius of the frame and fixed portion can be engaged at any one time.

Another example of a seat reclining mechanism found in the prior art is illustrated in U.S. Pat. No. 5,618,083 issued to Michael A. Martone and Tyrone R. Secord on Apr. 8, 1997. The Martone seat reclining device include a rack with a plurality of saw-toothed serrations and a fixed member with saw-toothed shaped serrations. A butterfly shaped arrangement transmits additional force from an external source to locking the rack and fixed portion in an engaged position.

However, this additional force is only applied when the force supplied by the external source is present, e.g., during a vehicle crash. If the additional force is not present, then the mechanism may become unintentionally unlocked, e.g., in the case of the vehicle hitting a bump in the road.

The present invention is aimed at overcoming one or more of the problems identified above.

SUMMARY OF THE INVENTION

In one aspect of the present invention, an apparatus for allowing pivotal movement of a top portion of a seat relative to a bottom portion is provided. The apparatus includes a mounting bracket, a fixed portion, and a rack portion. The mounting bracket is mounted to the bottom portion of the seat. The fixed portion has a plurality of fixed portion teeth extending from a fixed portion base and is mounted to the mounting bracket. The rack portion has a plurality of base portion teeth extending from the base portion towards the fixed portion. The end portion of the rack portion is pivotally connected to the top portion. An engaging member is pivotally connected to the mounting bracket. The engaging member moves the rack portion and the fixed portion in directions generally towards each other and to lock the rack portion and the fixed portion in an engaged relationship in response to movement of a handle in one direction. A disengaging member is pivotally connected to the mounting bracket. The disengaging member moves the rack portion and the fixed portion in directions generally away from each other.

BRIEF DESCRIPTION OF THE DRAWINGS

FIG. 5 is a diagrammatic illustration of the seat recliner locking mechanism of FIG. 2 shown in an unlocked position;

FIG. 6 is a diagrammatic illustration of a seat recliner locking mechanism, according to a second embodiment of the present invention;

FIG. 7 is a diagrammatic illustration of a cross-section of the seat recliner locking mechanism of FIGS. 4 through 6;

FIG. 8 is a diagrammatic illustration of a seat recliner locking mechanism according to a third embodiment of the present invention;

DETAILED DESCRIPTION OF THE INVENTION

With reference to the drawings and in operation, the present invention provides an apparatus or seat reclining lock mechanism 102. The apparatus 102 is generally used in conjunction with a reclining automotive seat 104.

Figure 1:
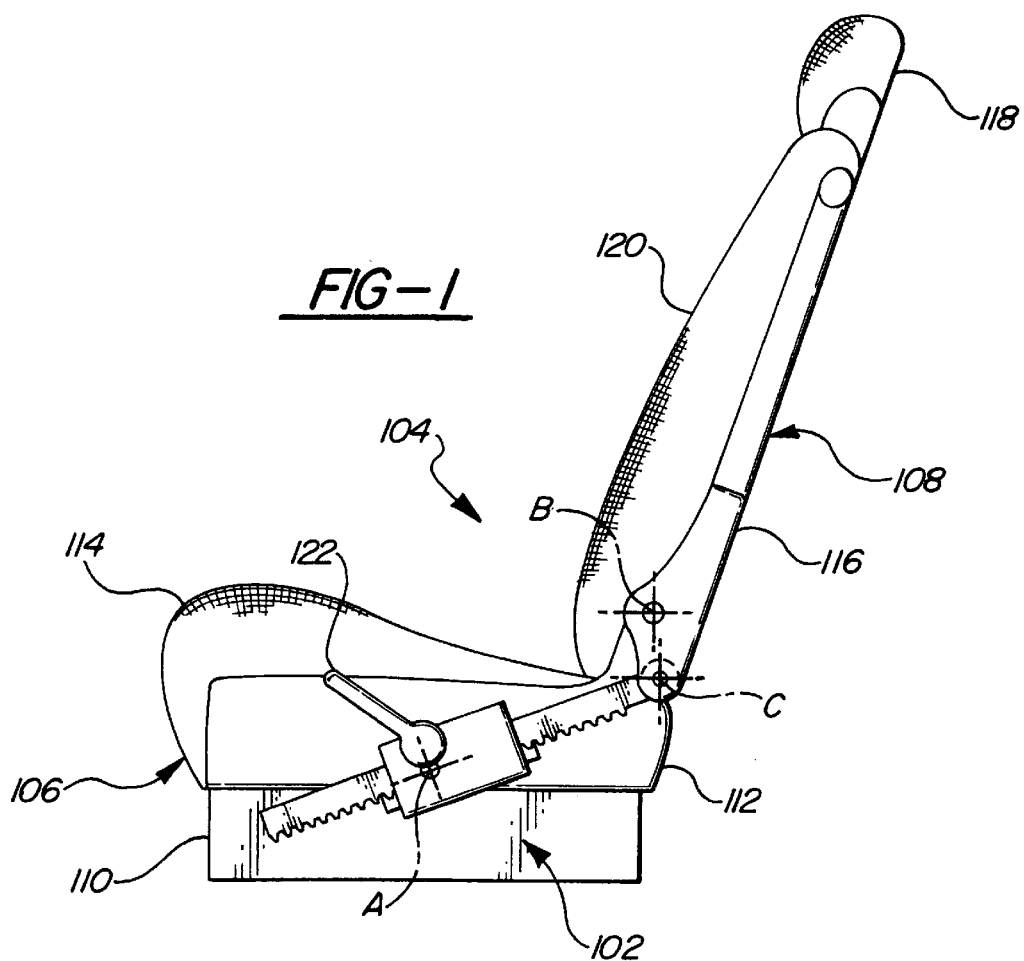
FIG. 1 is a diagrammatic illustration of an automotive seat in an upright position and a seat recliner locking mechanism, according to an embodiment of the present invention.

The seat 104 includes a bottom portion 106 and a top portion 108. The bottom portion 106 includes a base 110, a side portion 112, and a cushion pad 114. The base 110 is mounted to the floor of a motor vehicle, such as an automobile (not shown). The lock mechanism 102 is pivotally mounted to either the base 110 or the side portion 112. As shown in FIG. 1, the lock mechanism 102 is pivotally mounted to the side portion 106 at point A. The lock mechanism 102 may be connected to the bottom portion 106 using any suitable fastener which permits relative movement about point A.

The top portion 108 include a frame 116, a head rest 118 and a seat back pad 120. The top portion 108 is pivotally mounted to the bottom portion 106 at point B. The top portion 108 may be connected to the bottom portion 106 using any suitable fastener which permits relative movement about point B.

The lock mechanism 102 is pivotally connected to the frame 116 of the top portion 108 at point C. The lock mechanism 102 may be connected to the top portion 106 using any suitable fastener which permits relative movement about point C.

Figure 2:
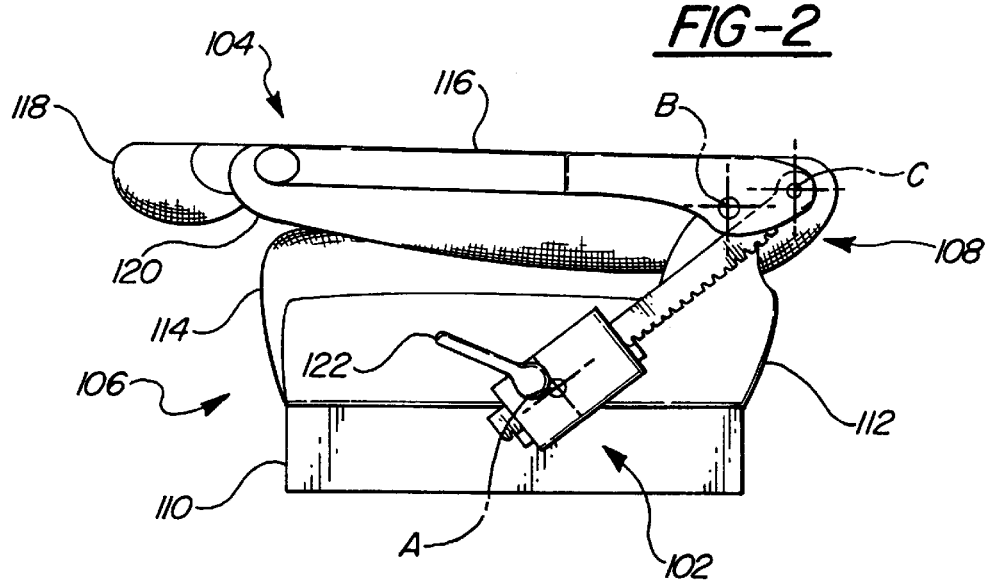
FIG. 2 is a diagrammatic illustration of the automotive seat and seat recliner locking mechanism of FIG. 1, shown in a load floor position.
Figure 3:
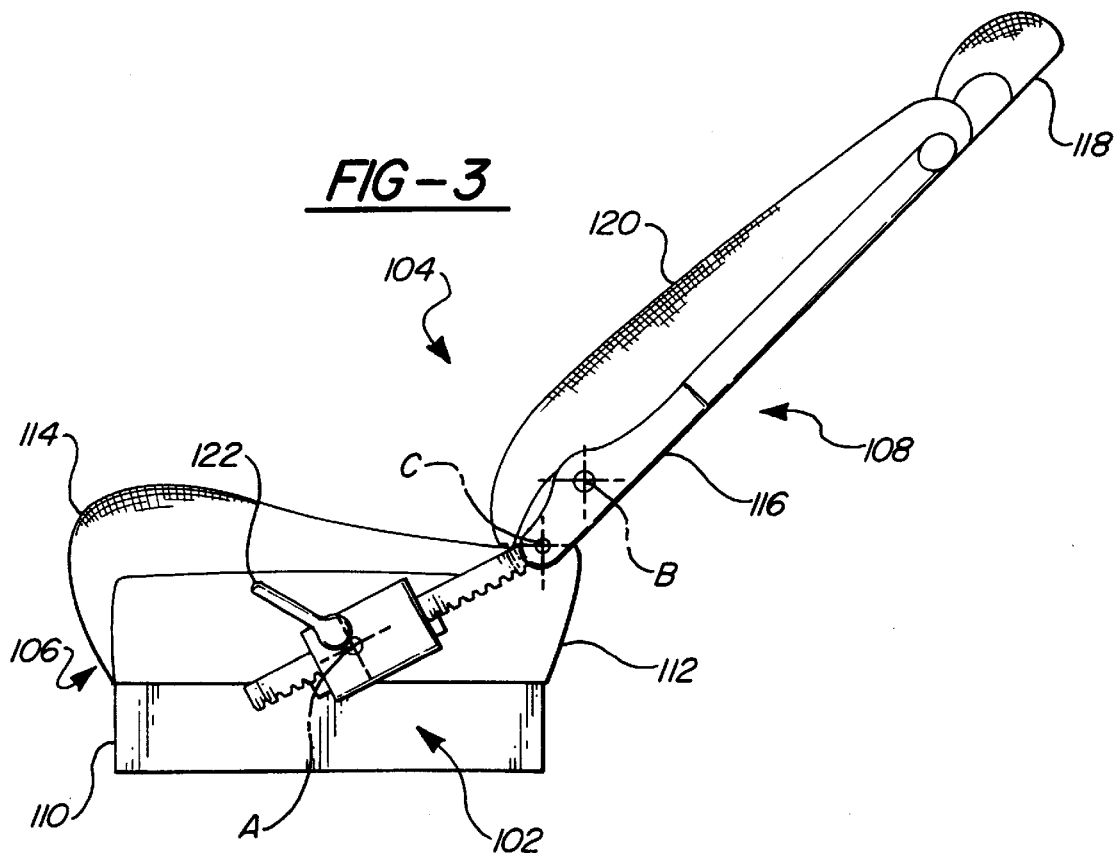
FIG. 3 is a diagrammatic illustration of the automotive seat and seat recliner locking mechanism of FIG. 1, shown in a reclining position.

Preferably, the lock mechanism 102 permits pivotal movement of the top portion 108 relative to the bottom portion 106 from a reclining position (see FIG. 3) to one or more upright positions (See FIG. 1) to a load position (See FIG. 2).

A handle 122 is provided to allow actuation of the lock mechanism from an engaged position (which prevents pivotal movement of the top portion 108 relative to the bottom portion 106) to a disengaged position (which allows pivotal movement of the top portion 108 relative to the bottom portion 106). Movement of the handle 122 in one direction, locks the lock mechanism 102 in the engaged position. Movement of the handle 122 in the opposite direction, releases the lock mechanism 122 from the engaged position.

With reference to FIGS. 4–9, the lock mechanism 102 includes a mounting bracket 402 pivotally mounted to the bottom portion 106 of the seat.

The lock mechanism 102 includes a fixed portion 404 mounted to the mounting bracket at point A. The fixed portion 404 includes a fixed portion base 406 and a plurality of fixed portion teeth 408 extending from the fixed portion base 404 in a first direction.

The lock mechanism 102 further includes a rack portion 410. The rack portion 410 includes a rack portion base 412, an end portion 414 and a plurality of rack portion teeth 416 extending from the rack portion base 412 towards the fixed portion 404 in a second direction. The second direction is opposite the first direction. The end portion 414 is pivotally connected to the top portion 108 of the seat 104 at point C. The end portion 414 may be connected to the top portion 104 using any suitable fastener which permits relative movement about point C.

The fixed portion teeth 408 and the track portion teeth 416 may have any appropriate shape to prevent relative lateral movement of the rack portion and the fixed portion 410, 404.

An engaging member 418 is pivotally connected to the mounting bracket 402 and coupled to the rack portion 410. Preferably, the lock mechanism 102 includes first and second engaging members 418A, 418B each pivotally connected to the mounting bracket 402 at spaced apart locations.

In a first embodiment (shown in FIGS. 4 and 5), the first and second engaging members 418A, 418B include first and second engaging cams 420A, 420B. A horizontal linking member 428 synchronizes the movement of the first and second engaging cams 420A, 420B about their respective pivot points in response to movement of the handle 122. The engaging cams 420A, 420B may be connected to the mounting bracket 402 using any suitable fastener.

The engaging members 418A, 418B are adapted to move the rack portion 410 in a direction generally towards the fixed portion and to lock the rack portion 410 and the fixed portion 404 in an engaged relationship.

A disengaging member 422 is pivotally connected to the mounting bracket 402 and coupled to the rack portion 410. Preferably, the lock mechanism 102 includes first and second disengaging members 422A, 422B each pivotally connected to the mounting bracket 402 at spaced apart locations. In the first embodiment, the first and second disengaging members 422A, 422B include first and second disengaging cams 424A, 424B.

First and second linking members 426 couple the first and second disengaging cams 424A, 424B to the first and second engaging cams 420A, 420B, thereby synchronizing movement of the first and second disengaging cams 424A, 424B about their respective pivot points with the rotation of the first and second engaging cams 420A, 420B.

The disengaging cams 424A, 424B are adapted to move the rack portion 410 in a direction generally away from the fixed portion in response to movement of the handle 122. The disengaging cams 424A, 424B may be connected to the mounting bracket 402 using any suitable fastener.

As described below, in the first embodiment the outer surfaces of the engaging and disengaging cams 420, 424 act upon respective surfaces of the rack portion 410.

Figure 4:
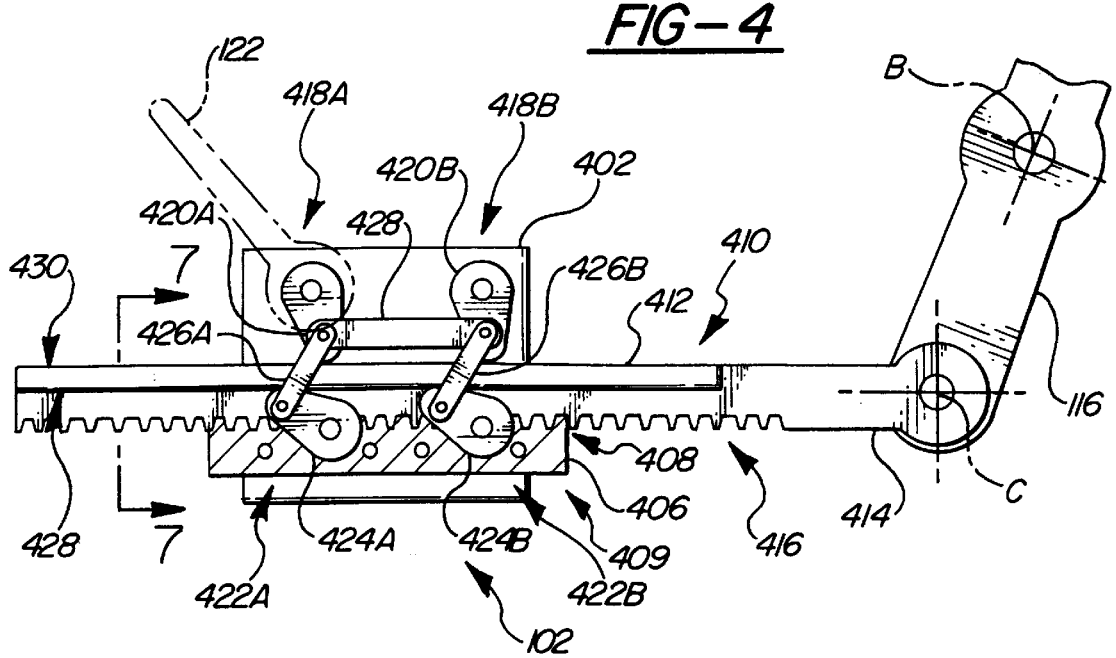
FIG. 4 is a diagrammatic illustration of the seat recliner locking mechanism of FIG. 1 shown in a locked position, according to a first embodiment of the present invention.

With particular reference to FIG. 4, the lock mechanism 102 is shown in an engaged position, i.e., the teeth of the rack portion 410 are in an engaged relationship with the teeth of the fixed portion 404, thereby effectively eliminating movement of the top portion 108 of the seat 104 relative to the bottom portion 106.

As shown, the outer surfaces of the engaging cams 420A, 420B act upon a rack engaging surface 430 of the rack portion 410 to maintain the lock mechanism 102 in the engaged position.

The handle 122 is coupled to one of the engaging or disengaging portions 418A, 418B, 422A, 422B. In FIGS. 4 and 5, the handle is shown as being coupled to the first engaging member 418A. However, the handle 122 could be connected to any of the engaging or disengaging members 418A, 418B, 422A, 422B.

From the engaged position (as shown in FIG. 4), the lock mechanism 102 is released and placed in a disengaged position through rotation of the handle 122 about its pivot point in a clockwise direction, thereby allowing the top portion 108 to move relative to the bottom portion 106.

During rotation of the handle 122, the outer surface of the first and second disengaging cam members 424A, 424B act upon a disengaging surface 432 of the rack portion 410, thereby forcing the rack portion 410 into the disengaged position.

To engage the lock mechanism 102 from the disengaged position, the handle 122 is rotated in a counter-clockwise direction. The engaging cams 420A, 420B act upon the rack engaging surface 430 thereby forcing the rack portion 410 into the engaged position.

In the first embodiment as shown in FIGS. 4 and 5, the rack portion 410 is shown as being on top of the fixed portion 404 with its teeth pointing in a generally downward direction. However, it should be noted that the rack may be turned upside down with its teeth pointing in a generally upward direction. In this variation, the fixed portion 404 would be over the rack portion 410 with its teeth pointing in a generally downward direction.

With reference to FIG. 6, a second embodiment of the present invention is illustrated. As in the first embodiment, in the second embodiment the first and second engaging and disengaging members 418, 422 include cams 420A, 420B, 424A, 424B whose outer surfaces act upon the engaging and disengaging surfaces 430, 432 of the rack portion 410.

Several features have been added to assist in maintaining the lock mechanism 102 in the engaged position. First, extra mass has been added in the form of extensions 602A, 602B to the disengaging cams 424A, 424B. Second a biasing spring 604 also helps to maintain the lock mechanism 102 in the engaged position.

A cross-section view of the lock mechanism 102 (in accordance with both the first and second embodiments) is shown in FIG. 7.

The mounting bracket 402 includes a mounting portion 702 with an aperture (not shown) for a suitable fastener (not shown) for mounting the mounting bracket 402 to the bottom portion 106 of the seat 104.

The engaging and disengaging cams 418A, 418B, 422A, 422B include beveled portions 704, 706, each with an aperture (not shown) for a suitable fastener (not shown) for mounting the respective portion 418A, 418B, 422A, 422B to the mounting bracket 402.

With reference to FIG. 8, a locking mechanism 102 in accordance with a third embodiment of the present invention is shown.

As in the first and second embodiments, the engaging portion 418 is pivotally connected to the mounting bracket 402 and coupled to the rack portion 410.

In the third embodiment, the engaging member 418 includes an engaging lever 802 pivotally connected to the mounting bracket 402. Preferably, the lock mechanism 102 includes first and second engaging members 418A, 418B with corresponding first and second engaging levers 802A, 802B.

The disengaging member 422 includes a disengaging lever 804 pivotally connected to the mounting bracket 402. Preferably, the lock mechanism 102 includes first and second disengaging members 422A, 422B with corresponding first and second disengaging levers 424A, 424B.

The first and second engaging levers 802A, 802B are pivotally connected to a first sliding member 806. The first sliding member 806 couples the first and second engaging levers 802A, 802B together and to the rack portion 410. The first sliding member 806 has a sliding relationship with the rack portion 410 in which a surface 812 of the first sliding member 806 is in contact with the rack engaging surface 430.

The first and second disengaging levers 804A, 804B are pivotally connected to a second sliding member 808. The second sliding member 808 couples the first and second disengaging levers 804A, 804B together and to the rack portion 410. The second sliding member 808 has a sliding relationship with the rack portion 410 in which a surface 814 of the second sliding member 808 is in contact with the rack disengaging surface 432.

The first and second sliding members 806, 808 are coupled by a sliding member linkage 810.

The locking mechanism 102 of FIG. 8 is in the engaged position. The handle (not shown) may be coupled to any of the levers 802A, 802B, 804A, 804B).

Assuming the handle 122 is coupled to one of the disengaging levers, to unlock the locking mechanism 102 and place it in a disengaged position the handle is rotated in a clockwise direction.

In response to rotation of the handle in the clockwise direction, the disengaging levers 804A, 804B rotate in a clockwise direction moving the second sliding member 808 in a direction generally up and to the right (in FIG. 8). The acting surface 814 of the second sliding member 808 acts upon the rack disengaging surface 432, forcing the rack portion 410 in a direction generally away from the fixed portion 404 thereby placing the locking mechanism 102 in the disengaged position.

From the disengaged position, to engage the locking mechanism 102, the handle is rotated in the counter-clockwise direction. In response to rotation of the handle in the counter-clockwise direction, the engaging levers 802A, 802B rotate in a clockwise direction moving the first sliding member 806 in a direction generally downward and to the left (in FIG. 8). The acting surface 812 of the first sliding member 806 acts upon the rack engaging surface 430, forcing the rack portion 410 in a direction generally toward the fixed portion 404 thereby placing the locking mechanism 102 in the engaged position.

Figure 9:
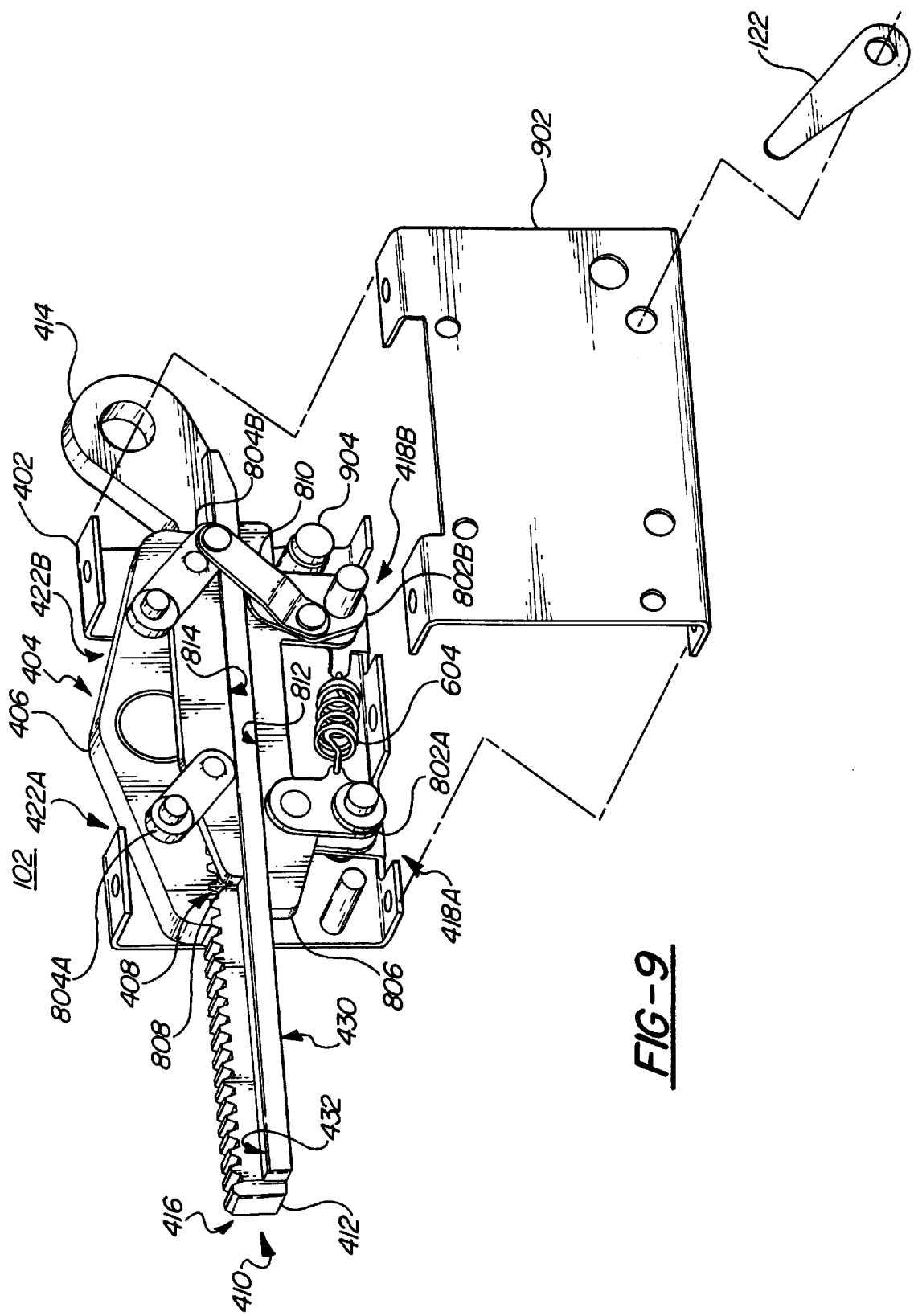
FIG. 9 is a three-dimensional representation of a seat recliner locking mechanism according to a fourth embodiment of the present invention

With reference to FIG. 9, a three-dimensional view of a locking mechanism 102 according to a fourth embodiment of the present invention is shown. The locking mechanism 102 of FIG. 9 is similar to the locking mechanism of FIG. 8, except that the relative position of the rack portion 410 to the fixed portion 404 is reversed, i.e., the rack portion 410 is above the fixed portion 404.

A cover plate 902 is provided to protect the locking mechanism components.

Preferably, the locking mechanism 102 includes first and second engaging members 418A, 418B which include first and second engaging levers 802A, 802B. A handle 122 (coupled to the second engaging lever in the locking mechanism of FIG. 8) is provided to engage and disengage the locking mechanism 102.

To engage the locking mechanism 102, the handle 122 is rotated clockwise, thereby rotating the second engaging lever 802B and the first engaging lever 802A (through the first sliding bar 806). This forces the first sliding bar 806 to act upon the rack engaging surface 430 and moves the rack portion 410 in a direction generally upward and to the right, thereby placing the locking mechanism 102 in the engaged position. A stop 904 prevents movement of the first and second engaging cams 802A, 802B past the engaged position.

To disengage the locking mechanism 102, the handle is rotated counter-clockwise, thereby rotating the second disengaging lever 804B in a clockwise direction through the sliding member linkage. The second disengaging lever 804B is also rotated in a clockwise direction through the second sliding member 808. The acting surface 814 of the second sliding member 808 acts upon the disengaging surface 432 moving the rack portion 410 in a direction generally downward and to the left, thereby placing the locking mechanism 102 in a disengaged position.

Figure 10:
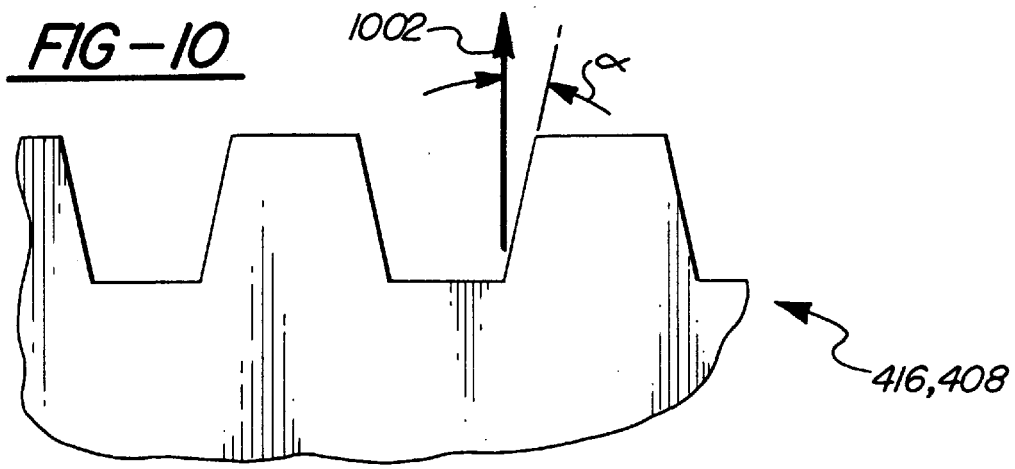
FIG. 10 is a diagrammatic illustration of the teeth of a fixed portion and a rack portion of a seat recliner locking mechanism of the present invention.

As stated above, the fixed portion teeth 408 and the track portion teeth 416 have an appropriate shape to prevent relative lateral movement of the rack portion 410 and the fixed portion 404. For example, the teeth 408, 416 may have a saw-toothed shape. With reference to FIG. 10 in the preferred embodiment, the teeth 408, 416 have a symmetrical shape with two sides and a vertical top. The result of this arrangement is that the unlatching direction is more perpendicular to the force applied to the mechanism 102 along the rack portion 410, thereby effectively eliminating the chances of an undesired unlatching of the lock mechanism 102. Preferably, the sides of the teeth 408, 416 have an angle in the range of zero (0) to ten (10) degrees from a line 1002 perpendicular to the rack portion base 412 or the fixed portion base 406.

With the teeth 408, 416 having sides at an angle between zero (0) and ten (10) degrees, the unlatching direction is close to being perpendicular to the force applied to the latching mechanism 102.

Preferably, the locking mechanism 102 is designed such that the engaging members 418A, 418B are perpendicular or almost perpendicular to the rack portion base 412. The locking mechanism 102 is a positive displacement latch because while it is in the locked or engaged position, for the rack portion 410 and the fixed portion 404 to become unintentionally separated, portions of the latch mechanism 102 would have to break. The latch mechanism 102 is at its strongest when the engaging members 418A, 418B are perpendicular to the rack portion base 412.

Figure 11:
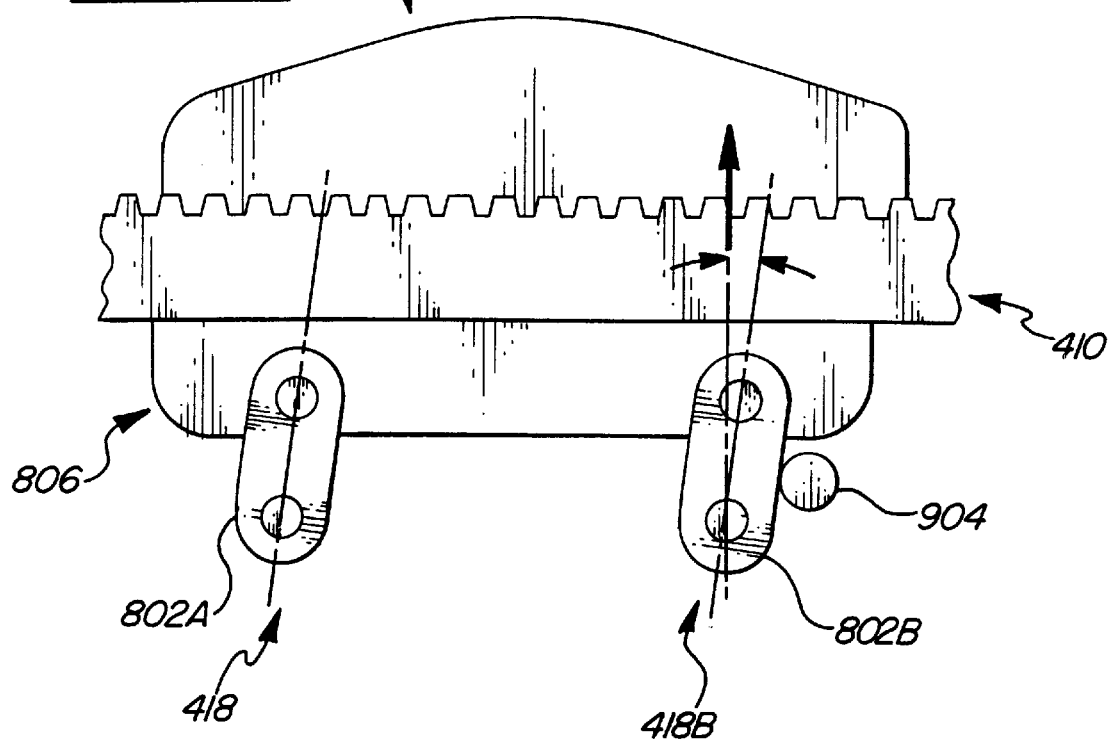
FIG. 11 is an enlarged illustration of a portion of a locking mechanism of the present invention.

As discussed above, a stop 904 is provided. The latch mechanism 102 is in the engaged position when the engaging member 418 is rotated until its further movement is prevented by the stop. This indicates the fully engaged position. With reference to FIG. 11 in the preferred embodiment, the latching mechanism 102, while in the engaged position, is adapted such that the engaging member 418 is slightly past a line 1102 perpendicular to the force (line 1104) applied to the latch mechanism 102, e.g., one (1) to fifteen (15) degrees past the perpendicular line 1102. This range maintains the strength of the locking mechanism without requiring a spring to maintain the lock position.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An apparatus for allowing pivotal movement of a top portion of a seat relative to a bottom portion, including:
    a mounting bracket adapted to be mounted to the bottom portion of the seat;
    a fixed portion having a fixed portion base and a plurality of fixed portion teeth extending from the fixed portion base in a first direction, the fixed portion being mounted to the mounting bracket;
    a rack portion having a rack portion base, an end portion and a plurality of base portion teeth extending from the base portion towards the fixed portion in a second direction, the second direction being opposite the first direction, the end portion being adapted to be pivotally connected to the top portion;
    an engaging member pivotally connected to the mounting bracket and coupled to the rack portion and the fixed portion, the engaging member adapted to move the rack portion in a direction generally toward the fixed portion and to lock the rack portion and the fixed portion in an engaged relationship;
    a disengaging member pivotally connected to the mounting bracket and coupled to the rack portion and the fixed portion, the disengaging member adapted to move the rack portion in a direction generally away from the fixed portion; and
    a handle connected to one of the engaging and the disengaging members and being adapted to pivotally move the engaging and disengaging members.

2. An apparatus, as set forth in claim 1, wherein the fixed portion teeth and the rack portion teeth have a saw-toothed shape.

3. An apparatus, as set forth in claim 1, wherein the fixed portion teeth and the rack portion teeth have two sides and a vertical top.

4. An apparatus, as set forth in claim 3, wherein the two sides of the fixed portion teeth and the rack portion teeth are set at an angle in the range of zero (0) to ten (10) degrees from a line perpendicular to the rack portion.

5. An apparatus, as set forth in claim 1, wherein the fixed portion teeth and the rack portion teeth have a shape to prevent relative lateral movement of the rack portion to the fixed portion.

6. An apparatus, as set forth in claim 1, including a stop, wherein the apparatus is in an engaged position when the engaging member is rotated until its further movement is prevented by the stop.

7. An apparatus, as set forth in claim 6, wherein the engaging member has an angular relationship with a line perpendicular to the rack portion, the angular relationship being slightly past the line when the apparatus is in the engaged position.

8. An apparatus, as set forth in claim 1, including a second engaging member.

9. An apparatus, as set forth in claim 1, including a second disengaging member.

10. An apparatus, as set forth in claim 1, wherein the engaging member includes an engaging cam.

11. An apparatus, as set forth in claim 10, wherein an outer surface of the engaging cam is adapted to act upon an engaging surface of the rack portion to force the apparatus into an engaged position in response to movement of the handle and to maintain the apparatus in the engaged position.

12. An apparatus, as set forth in claim 10, including a second engaging member, the second engaging member including a second engaging cam, and including a horizontal linking member coupled between the first and second engaging cams.

13. An apparatus, as set forth in claim 1, wherein the disengaging member includes a disengaging cam.

14. An apparatus, as set forth in claim 13, wherein an outer surface of the disengaging cam is adapted to act upon an disengaging surface of the rack portion to force the apparatus into a disengaged position in response to movement of the handle and to maintain the apparatus in the disengaged position.

15. An apparatus, as set forth in claim 1, including a second disengaging member, the second disengaging member including a second disengaging cam.

16. An apparatus, as set forth in claim 1, wherein the engaging member includes a first engaging cam and the disengaging member includes a first disengaging cam and further including:
    a second engaging member including a second engaging cam;
    a horizontal linking member coupled between the first and second engaging cams and adapted to synchronize pivotal movement of the first and second cams;
    a second disengaging member including a second engaging cam;
    a first linking member being coupled to the first engaging cam and the first disengaging cam and adapted to synchronize pivotal movement of the first disengaging cam with the first engaging cam; and
    a second linking member being coupled to the second engaging cam and the second disengaging cam and adapted to synchronize pivotal movement of the second disengaging cam with the second engaging cam.

17. An apparatus, as set forth in claim 16, wherein an outer surface of the first and second engaging cams are adapted to act upon an engaging surface of the rack portion to force the apparatus into an engaged position in response to movement of the handle and to maintain the apparatus in the engaged position and an outer surface of the disengaging cams are adapted to act upon an disengaging surface of the rack portion to force the apparatus into a disengaged position in response to movement of the handle and to maintain the apparatus in the disengaged position.

18. An apparatus, as set forth in claim 1, wherein the engaging member includes an engaging lever and further including a first sliding member pivotally connected to the engaging lever.

19. An apparatus, as set forth in claim 18, wherein a surface of the first sliding member is adapted to act upon an engaging surface of the rack portion to force the apparatus into an engaged position in response to movement of the handle and to maintain the apparatus in the engaged position.

20. An apparatus, as set forth in claim 18, including a second engaging member, the second engaging member including a second engaging lever pivotally connected to the first sliding member.

21. An apparatus, as set forth in claim 1, wherein the disengaging member includes a disengaging lever and further including a second sliding member pivotally connected to the disengaging lever.

22. An apparatus, as set forth in claim 21, wherein a surface of the second sliding member is adapted to act upon an disengaging surface of the rack portion to force the apparatus into a disengaged position in response to movement of the handle and to maintain the apparatus in the disengaged position.

23. An apparatus, as set forth in claim 21, including a second disengaging member, the second disengaging member including a second disengaging lever pivotally connected to the second sliding member.

24. An apparatus, as set forth in claim 1, wherein the engaging member includes a first engaging lever and the disengaging member includes a first disengaging lever and further including:
   a second engaging member including a second engaging lever;
   a second disengaging member including a second engaging cam;
   a first sliding member pivotally connected to the first and second engaging levers, wherein a surface of the first sliding member is adapted to act upon an engaging surface of the rack portion to force the apparatus into an engaged position in response to movement of the handle and to maintain the apparatus in the engaged position;
   a second sliding member pivotally connected to the first and second disengaging levers, wherein a surface of the second sliding member is adapted to act upon an disengaging surface of the rack portion to force the apparatus into a disengaged position in response to movement of the handle and to maintain the apparatus in the disengaged position; and
   a sliding member linkage coupled to the first and second sliding members.

25. An apparatus for allowing pivotal movement of a top portion of a seat relative to a bottom portion, including:
   a mounting bracket adapted to be mounted to the bottom portion of the seat;
   a fixed portion having a fixed portion base and a plurality of fixed portion teeth extending from the fixed portion base in a first direction, the fixed portion being mounted to the mounting bracket;
   a rack portion having a rack portion base, an end portion and a plurality of base portion teeth extending from the base portion towards the fixed portion in a second direction, the second direction being opposite the first direction, the end portion being adapted to be pivotally connected to the top portion;
   first and second engaging cams pivotally connected to the mounting bracket and coupled to the rack portion and the fixed portion, wherein an outer surface of the engaging cams are adapted to act upon an engaging surface of the rack portion to move the rack portion in a direction generally toward the fixed portion and to lock the rack portion and the fixed portion in an engaged relationship;
   first and second disengaging cams pivotally connected to the mounting bracket and coupled to the rack portion and the fixed portion, wherein an outer surface of the disengaging cams are adapted to act upon an disengaging surface of the rack portion move the rack portion in a direction generally away from the fixed portion;
   a handle connected to one of the first and second engaging cams and the disengaging cams and being adapted to pivotally move the engaging and disengaging cams.

26. An apparatus for allowing pivotal movement of a top portion of a seat relative to a bottom portion, including:
   a mounting bracket adapted to be mounted to the bottom portion of the seat;
   a fixed portion having a fixed portion base and a plurality of fixed portion teeth extending from the fixed portion base in a first direction, the fixed portion being mounted to the mounting bracket;
   a rack portion having a rack portion base, an end portion and a plurality of base portion teeth extending from the base portion towards the fixed portion in a second direction, the second direction being opposite the first direction, the end portion being adapted to be pivotally connected to the top portion;
   first and second engaging levers pivotally connected to the mounting bracket and coupled to the rack portion and the fixed portion,
   a first sliding member pivotally connected to the first and second engaging levers, wherein a surface of the first sliding member is adapted to act upon an engaging surface of the rack portion to move the rack portion in a direction generally toward the fixed portion and to lock the rack portion and the fixed portion in an engaged relationship;
   first and second disengaging levers pivotally connected to the mounting bracket and coupled to the rack portion and the fixed portion;
   a second sliding member pivotally connected to the first and second disengaging levers, wherein a surface of the second sliding member is adapted to act upon an disengaging surface of the rack portion to move the rack portion in a direction generally away from the fixed portion; and
   a handle connected to one of the first and second engaging levers and the disengaging levers and being adapted to pivotally move the engaging and disengaging levers.

* * * * *